April 16, 1968     O. M. KIEL     3,378,074

METHOD FOR FRACTURING SUBTERRANEAN FORMATIONS

Filed May 25, 1967     2 Sheets-Sheet 1

INVENTOR.
OTHAR M. KIEL

BY James E. Reed

ATTORNEY

April 16, 1968          O. M. KIEL          3,378,074

METHOD FOR FRACTURING SUBTERRANEAN FORMATIONS

Filed May 25, 1967          2 Sheets-Sheet 2

OTHAR M. KIEL INVENTOR

BY James E. Reed

ATTORNEY 3,378,074
METHOD FOR FRACTURING SUBTERRANEAN
FORMATIONS
Othar M. Kiel, Houston, Tex., assignor to Esso Production Research Company, a corporation of Delaware
Continuation-in-part of applications Ser. No. 421,578, Dec. 28, 1964, and Ser. No. 551,781, May 20, 1966. This application May 25, 1967, Ser. No. 641,275
33 Claims. (Cl. 166—42)

ABSTRACT OF THE DISCLOSURE

A fracturing method wherein a highly viscous fracturing fluid is injected into a fracture through a string of tubing or casing in the presence of sufficient low viscosity liquid to form a film of the low viscosity liquid between the highly viscous fluid and the tubing or casing wall.

This application is a continuation-in-part of Ser. No. 421,578, filed Dec. 28, 1964, and Ser. No. 551,781, filed May 20, 1966, both now abandoned.

Background of the invention (1) *Field of the invention.*—This invention relates to the hydraulic fracturing of subterranean formations surrounding oil wells, gas wells and similar boreholes.

(2) *Description of the prior art.*—Hydraulic fracturing has been widely used for stimulating the production of crude oil and natural gas from wells completed in low permeability reservoirs. The methods employed normally require the injection of a fracturing fluid containing a suspended propping agent into a well at a rate sufficient to open a fracture in the exposed formation. Continued pumping of fluid into the well at a high rate extends the fracture and leads to the buildup of a bed of propping agent particles between the fracture walls. These particles prevent complete closure of the fracture as the fluid subsequently leaks off into the adjacent formation and result in a permeable channel extending from the wellbore into the formation. The conductivity of this channel depends upon the fracture dimensions, the size of the propping agent particles, the particle spacing, and the confining pressures. Studies of conventional fracturing operations indicate that fracture widths seldom exceed about one-fourth inch and that conductivities in excess of about 250,000 millidarcy-inches are rarely obtained. The average width and conductivity are considerably lower than these values.

The fluids used in hydraulic fracturing operations must have filter loss values sufficiently low to permit buildup and maintenance of the required pressures at reasonable injection rates. This normally requires that such fluids either have very high viscosities or contain filter loss control agents which will plug the pores in the formation. Although the use of "low penetrating fluids" with viscosities of 5,000 centipoises or higher at atmospheric temperature has been proposed, much less viscous fluids are generally used. Typical fluids include crude oils and petroleum fractions having viscosities up to about 200 centipoises, gelled hydrocarbons containing aluminum soaps, polymers and similar thickening agents, temporary emulsions designed to break before the well is returned to production, and aqueous solutions containing polymers and other additives. The filter loss values of such fluids are high unless they contain filter loss control agents or other additives which tend to plug the pores in the formation. Many of the materials used as thickeners or gelling agents have this ability. In the absence of such materials, silica flour, lime, talc, guar gum, hydrocarbon resins, or similar agents are normally added to reduce the filter loss values.

The use of fracturing fluids having relatively low viscosities in conjunction with additives which provide the low filter loss values needed avoids excessively high friction losses in the tubing and casing. The wellhead pressures and hydraulic horsepower required to overcome such friction losses may otherwise be prohibitive. The gelled fluids prepared with water, kerosene and similar low viscosity liquids are particularly useful. Such fluids have apparent viscosities high enough to support the propping agent particles without excessive settling and yet shear down in contact with the tubing or casing wall to give low friction losses. The gelling agents also promote laminar flow under conditions where turbulent flow would otherwise take place and hence in some cases the losses may be lower than those obtained with the low viscosity base fluids containing no additives. Certain water-soluble polyacrylamindes, oil-soluble polyisobutylene and other polymers which have little effect on viscosity when used in low concentrations can be added to the ungelled fluids to achieve similar benefits.

As a result of the foregoing, the trend in fracturing has been toward the use of fluids which have viscosities sufficient to suspend the propping agent particles without excessive settling but contain filter loss agents designed to provide the required low penetrating properties. The propping agents employed include quartz sand grains, tempered glass beads, rounded walnut shell fragments, aluminum pellets, and similar materials. Such agents are generally used in concentrations between about one and about four pounds per gallon. The permeabilities obtained with these materials are roughly proportional to the square of the particle diameter and hence the use of particles up to about four mesh on the U.S. Sieve Series scale has been suggested. In practice, however, propping agents with particles sizes of 20 to 40 mesh or smaller are generally employed. At normal injection rates in the range between about 10 and about 50 barrels per minute, such particles can generally be suspended satisfactorily in fluids with viscosities from about 10 to about 30 centipoises. Where very high rates are used, the particles are often suspended in water or other fluids of even lower viscosity.

The use of larger propping agent particles to secure higher fracture conductivities has been hampered by difficulties in injecting the larger sized particles. Experience has shown that particles greater than about 20 mesh will frequently bridge across the mouth of the fracture and begin to accumulate in the wellbore. This is referred to as a "screen out." Once such an accumulation commences, the entire operation has to be terminated, even though only a small fraction of the required propping agent has been placed. Because of the frequency with which such difficulties are encountered when the larger particles are used, most operators prefer to employ 20 to 40 mesh or smaller particles.

The productivity improvement obtained as a result of fracturing depends upon the contrast between the conductivity of the fracture and the permeability of the formation. In zones of very low permeability, a narrow fracture with a conductivity well below 250,000 millidarcy-inches may permit a two to three-fold improvement in the fluid production rate. In a more permeable reservoir, on the other hand, such a fracture may result in only a small increase in production or may not be successful at all. Because of the poor response obtained in the more permeable zones, conventional fracturing operations are generally confined to severely damaged wells or wells completed in undamaged formations having permeabilities below about 15 to 20 millidarcies. Most such operations are carried out in wells with permeabilities in the 1 to 10 millidarcy range.

The incentives for developing fractures with conductivities sufficient to permit the application of fracturing to high permeability reservoirs are substantial. The low permeability formations in which conventional methods are used generally produce at low rates and hence total production remains low even though an improvement of several-fold is obtained. In reservoirs of higher permeability, the initial production rates are normally much higher and hence a successful fracturing operation may produce a much greater improvement in terms of incremental barrels of oil per day. This is true even though the percentage improvement may be somewhat smaller than in a reservoir of lower permeability. Efforts to extend fracturing operations into undamaged reservoirs with permeabilities substantially in excess of about 15 to 20 millidarcies have in the past been largely unsuccessful.

Summary of the invention

The fracturing method of this invention is carried out by injecting a heavy petroleum fraction, a viscous water-in-oil emulsion or other highly viscous fracturing fluid through a string of tubing or casing into a fracture in the presence of sufficient water or other low viscosity liquid to form a film of the less viscous liquid between the highly viscous fluid stream and the tubing or casing wall. Injection of the high viscosity fluid is continued until a fracture of sufficient width to produce a highly conductive channel has been formed. Particles of a propping agent suspended in the highly viscous liquid or in a fluid used to displace the high viscosity material are carried into the fracture. The injected fluid is then permitted to leak off into the formation until the fracture has closed sufficiently to hold the particles in place. Thereafter, the fluid remaining in the fracture may be produced back into the wellbore. Laboratory work and field tests have shown that this method permits the formation of fractures with substantially higher conductivities than have generally been obtained heretofore, that it results in greater productivity improvements than do conventional methods, and that it makes possible the application of fracturing to wells not readily susceptible to treatment by conventional fracturing methods.

The mechanisms responsible for the improved results obtained are not fully understood. Studies indicate, however, that the less viscous liquid acts as a lubricant for the highly viscous material as it passes through the tubing or casing and thus gives a relatively low pressure drop. As the fluids enter the fracture, low viscosity liquid contacting the formation readily permeates into the reservoir rock. The highly viscous liquid, on the other hand, has a much lower filter loss value and is therefore retained within the fracture. This use of an extremely viscous fluid to extend the fracture away from the wellbore results in a wider fracture than can be obtained with conventional fluids and thus makes possible the use of larger propping agents than have generally been practical heretofore. The combination of greater width and larger propping agent particles gives much higher conductivities than have been obtained in the past. Although other mechanisms may also be involved, the absence of screen-outs with large propping agent particles and the large productivity improvements obtained in formations with permeabilities of several hundred millidarcies indicate that these mechanisms play a dominant role.

Description of the preferred embodiments

Figure 1:
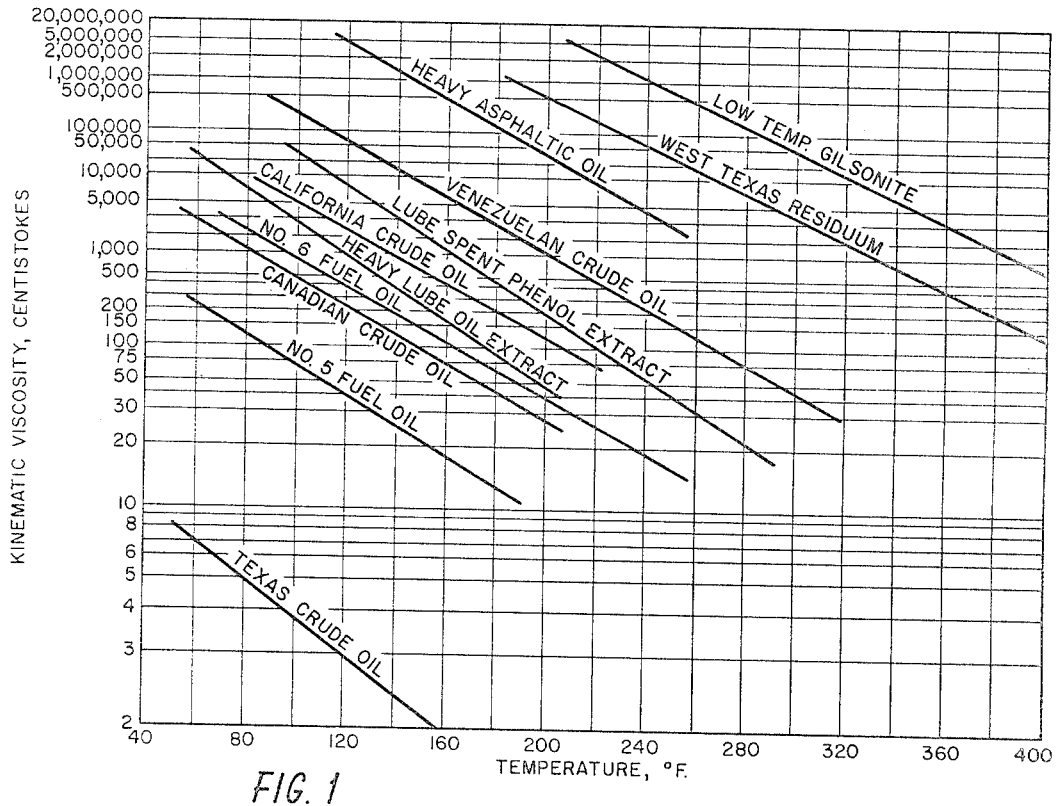
FIGURE 1 in the drawing is a graph showing the viscosity-temperature-relationships for typical heavy oils useful for purposes of the invention.

The method of this invention permits the use of fracturing fluids having viscosities considerably higher than those of fluids generally employed in the past. Suitable fluids include heavy crude oils and high boiling petroleum fractions, thickened oils, gelled hydrocarbons, liquid polymers, high viscosity water and oil emulsions prepared from highly viscous crude oils or petroleum fractions, aqueous solutions containing thickening or gelling agents, viscous solutions having dilatant properties, and the like. All of these fluids are not equally effective and hence certain highly viscous fluids are preferred over others. Highly viscous water-in-oil emulsions prepared by adding water or brine to a heavy crude oil or high boiling petroleum fraction in the presence of a suitable surface active agent having a distribution coefficient of about one have been found to be particularly effective for purposes of the invention.

The fracturing fluid viscosities required in carrying out the invention are determined in part by the permeability and porosity of the formation to be fractured, by the filtration pressure of the fluid in the fracture, by the temperature in the fracture, and by the rheological properties of the particular fluid selected. In general, the fluids used will have viscosities at atmospheric temperature between about 100 centipoises and about twenty million centipoises. In wells of moderate depth, fluids with viscosities between about 500 centipoises and about 500,000 centipoises at atmospheric temperature are usually most effective and are preferred. In deeper wells where temperatures may be 300° F. or higher, the heavier fluids with viscosities above about 500,000 centipoises at atmospheric temperature have advantages and will normally be employed.

At formation temperatures, the highly viscous fluids will preferably have viscosities equal to or greater than those defined by the equation $$\mu = 0.087 k \phi P_c$$

where $\mu$ is the viscosity of the highly viscous fluid at formation temperature in centipoises, $k$ is the permeability of the formation to the highly viscous fluid in millidarcies, $\phi$ is the porosity of the formation expressed as a decimal fraction, and $P_c$ is the difference between the fluid pressure in the fracture and the formation pressure in pounds per square inch. The fluid pressure within the fracture can be determined by multiplying the fracture gradient in pounds per square inch per foot by the depth in feet and adding the friction drop within the fracture. The fracture gradient is a measure of the pressure required to break down the formation and is normally between about 0.7 and about 0.9 pound per square inch per foot. The friction drop can be approximated by means of the equation $$P_f = 2.82 \times 10^{-4} \frac{Q \mu L}{h w^3}$$

where $P_f$ is the friction drop in pounds per square inch, Q is the injection rate in barrels of 42 gallon capacity per minute, $\mu$ is the fluid viscosity in centipoises, L is the fracture length in feet, $h$ is the fracture height in feet, and $w$ is the fracture width in inches. Values for L, $h$ and $w$ can be determined from equations for vertical fractures found in the literature. Newtonian or dilatant fluids are normally preferred because their viscosities are not adversely affected by shear rate. Fluids with viscosities of a hundred centipoises or more at formation temperature are particularly effective but in high temperature wells such viscosities may be difficult to obtain.

The heavy crude oils and petroleum fractions which may be employed for purposes of the invention include high viscosity crude oils, vacuum still residual fractions, heavy lube oil stocks, number 6 fuel oils, low pour point residual heating oils, extract fractions from the phenol extraction of lubricating oils, straight run asphalts, low temperature Gilsonite, and similar hydrocarbon oils having viscosities between about 100 centipoises and about twenty million centipoises at atmospheric temperature. Heavy oils with viscosities of 10,000 centipoises or higher at atmospheric temperature are preferred. The kinematic viscosity-temperature relationships for typical heavy oils which have been found suitable are shown in FIGURE 1 of the drawing. The curve for a typical crude oil of moderate viscosity is shown for comparative purposes. It will be noted that the viscosities decrease rapidly with increasing temperature. This change in viscosity can be reduced somewhat by adding viscosity index improvers or similar materials to certain of the heavy oils. Suitable viscosity index improvers include those composed of methacrylic or polyisobutylene polymers in diluent oils. In some cases the change in viscosity can also be reduced by injecting water, liquid carbon dioxide, liquid nitrogen or a similar material to cool the formation prior to introduction of the heavy oil or other highly viscous fracturing fluid. Oils having viscosities in excess of about 3,000 centipoises at ambient temperature are difficult to handle with conventional pumping equipment and are therefore normally heated prior to use. It is preferred to deliver the extremely viscous materials to the well site in heated tank trucks and hold them at elevated temperature until they are needed. The lubricating oil extracts and similar high viscosity oils substantially free of materials which may tend to come out of solution in the presence of light hydrocarbons are particularly effective for purposes of the invention and are especially useful for fracturing gas wells and water injection wells.

Figure 2:
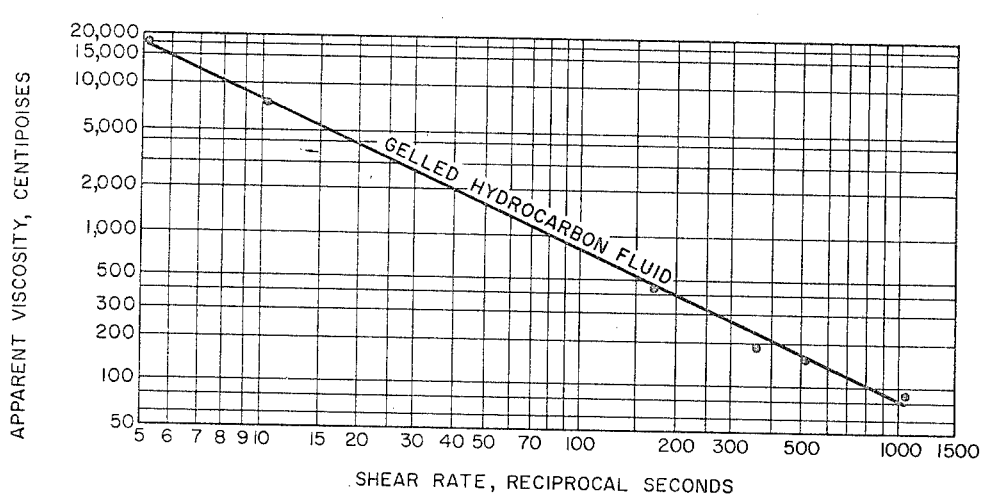
FIGURE 2 depicts the viscosity-shear behavior for a typical gelled fluid.

Thickened or gelled oils useful as viscous fracturing fluids in accordance with the invention may be prepared by adding colloidal materials such as asphalt or pitch, high molecular weight oil soluble polymers such as polyisobutylene, and similar materials to crude oils, diesel fuels, fuel oils and similar liquid hydrocarbons. Highly viscous napalm-type gelled hydrocarbon fluids produced by the addition of aluminum soaps or mixed hydroxy aluminum soaps such as mixtures of aluminum laurate and aluminum naphthenate to kerosene or crude oil may also be used. The gelled fluids normally have non-Newtonian characteristics and lose viscosity at increasing shear rates. They are also temperature sensitive. FIGURE 2 in the drawing shows the behavior, at various shear rates, of a typical high viscosity gelled fluid produced by adding aluminum soaps to a light fuel oil. The apparent viscosity of this fluid decreased from an initial value of 17,000 centipoises at a low shear rate to a value of about 90 centipoises at a shear rate of 1020 reciprocal seconds. If gelled fluids are used, the viscosity values should therefore be taken at temperatures and shear rates comparable to those existing in the fracture under the injection conditions to be employed. These shear rates can be approximated by means of the equation $$\gamma = 6\frac{V}{W}\left(\frac{1+2n}{3n}\right)$$

where $\gamma$ is the shear rate in reciprocal seconds, V is the linear velocity of the fluid in the fracture in feet per second, W is the fracture width in feet, and $n$ is the power law exponent.

High viscosity emulsions suitable for use as viscous fracturing fluids in carrying out the invention may be either water-in-oil or oil-in-water emulsions. Emulsions which have high viscosities under the temperature and shear conditions existing in fractures can be prepared with kerosene, diesel fuel, heating oil, crude oil or a similar hydrocarbon oil and water, brine or an acid solution containing a suitable surface active agent or emulsifier. Surfactants which tend to render the walls of the tubing or casing water-wet are preferred. A variety of different commercially available surface active agents are suitable if employed in the proper concentrations. These include the alkyl esters of sodium sulfosuccinic acid, alkali metal salts of alkylaryl benzene sulfonic acids, soluble salts of alkyl naphthalene sulfonic acids, alkyl ethers of polyalkylene glycols, polyalkylene esters of fatty acids, polyoxyalkylene anhydrosorbitol esters of fatty acids, long chain amine hydrochlorides, alkylene oxide-amine condensation products, alkylene oxide-alkylphenol condensation products, long chain polyamides, long chain dialkyldimethylammonium halides, long chain alcohol hydrogen sulfates, long chain carboxylic acids and the like. Methods for the production of suitable high viscosity emulsions using surface active agents have been described in the literature and will be discussed in greater detail hereafter.

High viscosity aqueous fluids suitable for purposes of the invention include aqueous solutions containing polymeric thickeners or gelling agents. A variety of polymers which can be added to water, brine or acid solutions in concentrations sufficient to produce solutions or gels of high apparent viscosity are available, including synthetic polymers such as the polyacrylamides and sulfonated polyvinylaromatics, natural gums such as guar gum, and bacterially produced polymers such as dextran and the heteropolysaccharides produced by bacteria of the genus Xanthomonas. The bacterially produced polymers and certain synthetic materials such as sulfonated polyvinylstyrene are particularly effective. The aqueous fluids containing thickeners or gelling agents are similar to the gelled hydrocarbons in that they possess non-Newtonian properties and hence the thickeners or gelling agents should be used in concentrations sufficient to obtain the desired viscosities under the temperature and shear conditions existing in the fracture. Filter loss agents, surface active agents, and other additives may be incorporated in any of the highly viscous fluids if desired. Certain of the polymeric additives have polyfunctional characteristics and are particularly useful for improving the high viscosity gelled fluids.

The preferred highly viscous fluids for carrying out the invention are water-in-oil emulsions or suspensions prepared by blending water or brine and a surface active agent into a crude oil, residual petroleum fraction, or refinery stream having a viscosity in excess of about 500 centipoises at atmospheric temperature. Tests have shown that alkali metal salts of diesters of sulfosuccinic acid such as sodium dioctylsulfosuccinate in combination with polyalkyleneoxide ethers of alkyl esters of aliphatic dicarboxylic acids such as polyethyleneoxide ethers of diisooctyl esters of succinic acid, polyoxyethylene glycol ethers of dialkyldicarboxylic acids such as polyoxyethylene glycol ethers of dioctyl maleate, and other surface active agents having distribution coefficients of about one can be used with extremely viscous oils and water or brine to produce viscous water-in-oil emulsions which do not readily change composition in the presence of free water. Such emulsions apparently require the addition of considerable energy before they will take on additional water and therefore tend to reject the free water. This permits the pumping of such emulsions in the presence of a film of free water without loss of their high viscosities and facilitates carrying out of the invention. The composition, preparation and use of such emulsions will be discussed in greater detail hereafter.

The highly viscous fracturing fluids described are employed in conjunction with less viscous fluids which serve to lubricate the highly viscous fluids through the tubing or casing and thus make the improved results obtained with the highly viscous fluids feasible. The less viscous fluids utilized will normally have viscosities below about 10 centipoises at atmospheric temperature, preferably below one centipoise, but in some cases their viscosities may be somewhat higher. Suitable low viscosity liquids include water; aqueous solutions containing salts, surface active agents, and other additives; light crude oils;

vegetable oils, kerosene; liquified petroleum gas; naphtha; alcohols; glycols; ethers; ketones; halohydrocarbons; and the like. The liquids chosen should be stable at the temperatures existing in the tubing or casing and substantially inert toward the highly viscous fracturing fluid. For economic reasons, water, brine or kerosene is generally chosen. It is normally preferred that the low viscosity material be substantially immiscible with the highly viscous liquid so that mixing of the two is retarded and that a demulsifier be added to prevent or retard emulsion formation but this is not always essential where there is a substantial difference between the viscosities of the two fluids and injection equipment which minimizes mixing is used. The ratio between the viscosity of the highly viscous fluid in centipoises and that of the less viscous fluid in centipoises will generally be at least ten to one under atmospheric temperature conditions. Viscosity ratios of 100 to one or greater at atmospheric temperature are particularly effective and are prefered in most operations.

In carrying out the invention, the highly viscous fracturing fluid and less viscous fluid are introduced into the tubing or casing under conditions such that a film of the less viscous material is formed between the highly viscous liquid and the tubing or casing wall. It is generally preferred to inject the viscous fracturing fluid as a central stream and separately introduce the less viscous material through an annular or tangential injector or by means of a T or Y fitting attached to the top of the tubing or casing string. This facilitates formation and maintenance of the low viscosity film over a wide range of injection conditions. Where the two liquids are substantially immiscible with one another and a suitable surface active agent or demulsifier is employed to prevent or retard stable emulsion formation, however, it has been found that separate introduction of the fluids is not always necessary and that in some cases they may instead be introduced as a single stream. Under the dynamic conditions in the tubing or casing during injection, the low viscosity liquid tends to seek the low energy position adjacent the pipe wall. Surface active agents which reduce the ability of the highly viscous liquid to wet the well of the pipe; glass, ceramic or other pipe linings which are more readily wetted by the low viscosity liquid than by the highly viscous liquid; and spiral vanes or other mechanical pipe adaptations can be used to promote formation and maintenance of the film. Regardless of the method employed, the conditions must be such that a film of the low viscosity material is formed on the tubing or casing wall and a viscosity discontinuity exists in the fluid stream adjacent the outer periphery. The fluid composition from the center to the periphery is thus non-homogeneous. The film formed in this manner, which may occupy as little as three percent or as much as fifteen percent of the total fluid volume, results in a low pressure drop through the tubular goods, normally lower than that which would be obtained if the low viscosity fluid were injected alone at the same total rate. After the fluids enter the fracture, the low viscosity fluid contacting the formation quickly permeates into the rock. The high viscosity material, on the other hand, remains in the fracture and produces a relatively high pressure drop between the mouth of the fracture and the point of propagation. This pressure drop and the low filter loss of the highly viscous liquid permit the opening of a considerably wider fracture than can otherwise be obtained. Since large propping agent particles can therefore be used, fractures with high conductivities can be obtained.

Figure 3:
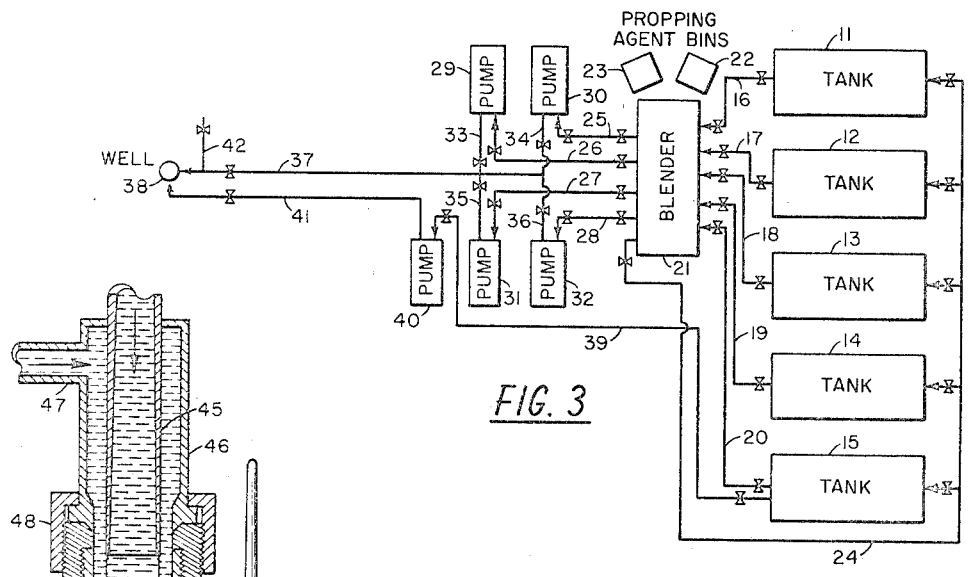
FIGURE 3 is a schematic representation of apparatus which may be utilized in carrying out the invention.

Apparatus which may be employed for injecting the highly viscous fracturing fluid in conjunction with a fluid of lower viscosity is shown schematically in FIGURE 3 of the drawing. This apparatus includes a plurality of tanks indicated by reference numerals 11, 12, 13, 14 and 15. Two hundred barrel steel tanks open to the atmosphere are generally used. Hoses or other lines 16, 17, 18, 19 and 20 are provided for connecting the tanks in parallel to a blender 21. The blender may be of the type conventionally used in oilfield fracturing operations and will normally include jets and a ribbon mixer for suspending propping agent from bins 22 and 23 in the viscous fluid. It is generally preferred to operate the mixer at high speed to prevent buildup and "slugging" of the propping agent particles. If the blender does not include a ribbon mixer, extra jets may be installed and connected to the blender pump or an auxiliary pump to provide more intense agitation. A return line 24 from the blender to each of the tanks permits circulation of the fluid to promote initial mixing of the fluid before the propping agent is added. Discharge lines 25, 26, 27 and 28 extend from the blender to fracturing pumps 29, 30, 31 and 32. These pumps are normally high pressure positive displacement triplex pumps driven by diesel engines or turbines and are usually truck-mounted. The pumps are connected in parallel as shown. Discharge lines 33, 34, 35 and 36 are manifolded to injection line 37 which extends to the wellhead 38. The pumps, blender, tanks and other equipment are normally located some distance from the well to minimize the danger in case of a fire or blowout. Tank 15 is connected by line 39 to a high pressure pump 40 for the injection of low viscosity fluids into the well through line 41. An oil field pumping truck of the type conventionally used for the injection of acids or cement is generally employed. An auxiliary line 42 extends from line 37 adjacent the wellhead to permit bleeding off of the high pressure fluid at the conclusion of the operation. As indicated in the drawing, valves are provided throughout the system to permit control of the fluids and the disconnection of individual units of equipment as necessary.

Figure 4:
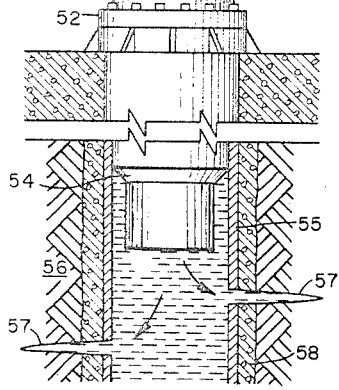
FIGURE 4 depicts a wellhead assembly and other equipment useful in conjunction with the apparatus of FIGURE 3.

FIGURE 4 in the drawing depicts a wellhead arrangement particularly suitable for use with the apparatus of FIGURE 3. The injection line 37 of FIGURE 3 is connected to an annular injector assembly at the wellhead. This assembly includes a tapered inner sleeve 45 into which fluid from line 37 passes. The tapered sleeve is surrounded by a concentric outer sleeve 46 containing an inlet 47 connected to low viscosity fluid line 41. The outer sleeve extends inwardly about the lower end of the tapered inner sleeve to form a narrow annular passageway. A coupling 48 extends between the annular sleeve and a threaded connecting member 49. A full opening control valve 50 is attached to the upper end of the tubing beneath the annular injector assembly. Below the control valve is a blowout preventer 51 and a wellhead 52. In the installation shown, tubing string 53 extends through the blowout preventer and wellhead to a packer 54 installed in the casing 55 a short distance above the subsurface zone to be fractured, indicated by reference numeral 56. If desired, plastic lined tubing, pipe provided with a glass or ceramic lining, or tubing having internal spiral ribs may be used to further promote formation and stability of the film of low viscosity fluid. Linings that are preferentially wetted by the low viscosity fluid or the low viscosity fluid-surface active agent combination may be particularly effective. Perforations 57 extend from the wellbore through the casing and cement 58 into the producing zone. The apparatus thus illustrated is exemplary of that employed in carrying out the invention. It will be understood, however, that the invention is not restricted to the use of such apparatus. The method does not require the presence of a packer; may be used to fracture through the tubing, through the casing, through both the tubing and casing, or, in certain wells, through two or more strings of tubing simultaneously; can be carried out without the use of an annular injector or similar device; and is applicable to injection wells, production wells, and other boreholes in both onshore and offshore locations.

As pointed out earlier, it is preferred to employ a highly viscous water-in-oil emulsion or suspension as the viscous fracturing fluid and to use water or brine containing a suitable surface active agent as the less viscous liquid. In a typical operation of this type, a heavy residual petroleum fraction with a viscosity of about 50,000 centipoises at atmospheric temperature is used to prepare the emulsion or suspension. This oil is delivered to the well site in a tank truck provided with heating coils and is maintained at a temperature of about 180° F. to facilitate handling. Tanks 11, 12, 13 and 14 in FIGURE 3 are used as fracturing fluid tanks. In each of these tanks are placed two volumes of the heavy oil and one volume of water including about 0.1% by weight of a surface active agent containing as the active ingredient about 60 volume percent of dioctyl sodium sulfosuccinate, about 30 volume percent of dihexyl sodium sulfosuccinate, and about 10 volume percent of isooctylphenyl polyethyleneoxyethanol containing about 9 to 10 moles of ethylene oxide per mole of isooctylphenol. Experience has shown that the use of such a mixture of oil, water and surfactant normally results in a loose oil-external emulsion or suspension which will not readily accept additional water and therefore persists in the presence of free water without any appreciable change in properties. With certain oils containing natural surface active constituents in high concentrations or with other surface active agents, the concentration of the surfactant in the water phase or the ratio of oil to water may have to be altered somewhat. The concentration and ratio needed in a particular system can be determined in the laboratory by adding water and surfactant to the heavy oil in incremental amounts until rotation of the fluids in a beaker results in the formation of a distinct water film and the heavy oil no longer adheres to the beaker wall. Concentrations between about 0.05 and about 2.0 weight percent and ratios between about six to one and about one to two are generally used.

Tank 15 is filled with water containing the surface active agent in the same concentration in which it was employed in the fluids in tanks 11 through 14. The water and oil in each of the fracturing fluid tanks is thoroughly mixed by circulating fluid from the bottom of the tank through the blender and discharging it back into the top of the same tank through line 24. It is generally advisable to circulate the fluid at a rate of from about 15 to about 20 barrels per minute. The stream of fluid discharged into the top of the tank from the blender is initially quite turbulent. After the fluid has been circulated for a short time, the liquid emerging from the discharge line switches from a highly turbulent stream with considerable splattering to a very smooth laminar stream with essentially no splattering. This change generally takes place suddenly and can be used in the field as a test to determine whether the water and surface active agent have been properly mixed with the oil. If it does not occur, draining off water or adding salt to the aqueous phase will generally promote it. After the change in flow characteristics has occurred, the entire tank of fluid is circulated once more to assure complete mixing. The fluids in each fracturing fluid tank are mixed in turn in this manner. The water and surface active agent in tank 15 of FIGURE 3 may be mixed by circulating fluid from the tank to a water pump and back into the tank so that the tank contents will roll. Alternatively, propeller mixers or similar devices may be utilized to assure complete mixing of the water and surface active agent.

After the water, oil, and surfactant in tanks 11, 12, 13 and 14 and the water and surface active agent in tank 15 have been thoroughly mixed, the lines in the system are filled with fluid and pressure tested. The test procedure may be essentially identical to that used in conventional fracturing operations. Once this has been completed, the tubing in the well is filled with water by pumping fluid from tank 15 through lines 39 and 41 by means of pump 40. The water thus injected flows through inlet 47 of the annular injector, passes down the tubing string into the space beneath packer 54, and enters the perforations 57. The injection of this water is continued at a high rate until a pressure sufficient to break down the formation and initiate a fracture is obtained. Formation of the fracture will normally be indicated by a sharp drop in pressure. As soon as this occurs, the rate of water injection is cut back to about 1/10 the rate at which fluid is to be injected to propagate the fracture and carry the propping agent particles into place. The fracturing pumps 29, 30, 31 and 32 are then separately primed with the emulsion or suspension from tanks 11, 12, 13 and 14 by means of the pumps on blender 21. The fracturing pumps are started so that fluid is drawn into the pumps through lines 25, 26, 27 and 28. Any free water present in the bottom of tanks 11, 12, 13 and 14 or the blender will be pumped out first. As soon as the emulsion or suspension is being pumped into the fracture satisfactorily, propping agent from bins 22 and 23 can be added to the fluid in the blender. The emulsion or suspension containing suspended propping agent particles flows from the blender through the pumps and injection line 37 to tapered sleeve 45 in the annular injector.

The propping agent is generally added to the fluid in the blender in amounts sufficient to give a propping agent particle concentration between about one-fourth and about 20 pounds per gallon. The quantity used will depend in part upon whether a partial monolayer or a fully packed fracture is desired. For a partial monolayer, a concentration near the lower end of the range will normally be employed; whereas a considerably higher concentration will ordinarily be used to produce a fully packed fracture. Concentrations well above those feasible in conventional operations can be used if desired. Sand will generally be used as the propping agent in relatively shallow wells up to about 7,500 feet but in deeper wells it is advantageous to employ glass beads, steel shot or other materials capable of withstanding higher confining loads than ordinary sand. Injection of the proppant-laden fluid, normally at a rate of from about two to about 20 barrels per minute, is continued until from about 5,000 to 150,000 pounds or more of the propping agent has been introduced into the fractured formation.

As the proppant-laden fluid is injected, water is simultaneously pumped from tank 15 through line 39, pump 40 and line 41 to the concentric sleeve of the injector. This results in the formation of a thin annular film of water between the lower end of the tapered sleeve and the surrounding concentric sleeve. The rates will preferably be such that the two fluid streams have the same velocity at the lower end of the injector assembly. As the fluids emerge into the open tubing string below the assembly, the film of water surrounds the viscous fracturing fluid stream. Little mixing of the two fluids takes place. The film of water persists as the fluids move through control valve 50, blowout preventer 51, and the tubing string. Due to the presence of the surface active agent, little or no water is transferred from the film to the fracturing fluid. The water prevents contact of the viscous fluid with the tubing wall and thus permits injection of the fluids without the high friction losses which would otherwise occur. Studies have shown that the water film is normally laminar, even though high injection rates are employed, and that the addition of friction reducers to the water therefore generally has little or no effect. The use of a sufficiently large excess quantity of water may tend to promote turbulence within the film, however, and in such a case a friction reducer may be beneficial. Friction reducers are also sometimes helpful where low viscosity fluids other than water are employed.

The high viscous oil-external fracturing fluid and accompanying film of free water emerge from the lower end of the tubing beneath packer 54 and flow through the perforations into the fracture. Considerable agitation takes place as the fluids enter the perforations. The energy thus made available to the fluid system tends to promote the inclusion of additional water in the emulsion and may thus give rise to an increase in the viscosity of the fluid. Free water which remains external of the waterin-oil emulsion is rapidly absorbed by the porous formation so that the fluid flowing within the fracture has a high viscosity. This highly viscous fluid produces a relatively high pressure drop in the fracture and thus leads to the generation of a wider fracture than is normally obtained in conventional operations.

After the required quantity of fluid and propping agent have been injected, the blender and fracturing pumps are shut down. Water or crude oil may be circulated through the equipment and into the tubing to clean out any heavy emulsion remaining. The water or oil should normally not be injected into the fracture itself. The well is then closed in and allowed to stand, generally overnight. As the injected fluid slowly leaks off into the adjacent formation, the fracture closes on the propping agent particles and holds them in place. After the pressure has been bled off, the injected fluid may be produced back into the wellbore. Dilution by oil from the formation normally accelerates production of the injected fluid. Lease crude oil, kerosene, diesel fuel or the like can be injected into the casing to dilute the heavy oil further and facilitate its removal from the well. Small amounts of propping agent may be dislodged from the face of the packed fracture when the well is first returned to production, but the amount of this material produced will not normally be sufficient to create any serious production problems.

The advantages of the process of the invention over conventional fracturing methods are indicated in Table I above. The table sets forth the results of a study of the improvements in productivity which can be obtained with fracturing fluids of various viscosities and those which can be secured by using the same fracturing fluids in conjunction with low viscosity liquids as described above. The study was based upon a mathematical model which takes into account the characteristics of the formation being fractured, the properties of the fracturing fluid used, the type of propping agent employed, and the injection conditions utilized. In order to show the effect of viscosity alone, all fluids were treated as having the same filter loss value. The viscosities given are those of the fluid within the fracture. Since most fluids lose viscosity with increasing temperature, the viscosities at atmospheric temperature will normally be somewhat higher than the values shown. The total horsepower requirements set forth include the horsepower necessary to overcome friction losses in the tubing, horsepower consumed by the pressure drop across the perforations, and the horsepower required to generate the fracture. The column subheaded "Fracturing Fluid Alone" indicates the theoretical horsepower requirements where the fracturing fluid is injected through the tubing in the conventional manner. The horsepower requirements under the subheading "Fracturing Fluid + Low Viscosity Liquid" are those necessary if a film of low viscosity liquid is used in accordance with the invention. Because the fracture flow capacities and productivity ratios in the table are based upon an equation which is conservative, particularly with respect to operations carried out with fluids of relatively high viscosity, values somewhat higher than those shown are generally obtained in actual field operations carried out in accordance with the invention.

TABLE I.—COMPARISON OF VARIOUS FRACTURING TREATMENTS

| Injection Rate (bbl./min.) | Fracturing Fluid Viscosity (cp.) | Horsepower Requirements | | Fracture Width (in.) | Fracture Length (ft.) | Maximum Sand Mesh Size (up to 8–12) | Fracture Flow Capacity (md.-in.) | Productivity Ratio [1] |
|---|---|---|---|---|---|---|---|---|
| | | Fracturing Fluid Alone | Fracturing Fluid+Low Viscosity Liquid | | | | | |
| 5 | 10 | 493 | 362 | 0.139 | 694 | 20–40 | 1,440 | 1.0+ |
| 10 | 10 | 2,016 | 1,287 | 0.192 | 762 | 16–30 | 1,980 | 1.0+ |
| 5 | 100 | 641 | 368 | 0.244 | 566 | 10–20 | 6,800 | 1.2 |
| 10 | 100 | [2] 3,001 | 1,300 | 0.317 | 583 | 8–12 | 47,500 | 3.0 |
| 5 | 500 | 1,558 | 374 | 0.350 | 475 | 8–12 | 52,500 | 3.1 |
| 10 | 500 | [2] 5,649 | 1,316 | 0.439 | 473 | 8–12 | 61,000 | 3.4 |
| 5 | 1,000 | [2] 2,828 | 378 | 0.406 | 437 | 8–12 | 61,000 | 3.3 |
| 10 | 1,000 | [2] 10,722 | 1,326 | 0.503 | 430 | 8–12 | 75,500 | 3.6 |
| 5 | 3,000 | [2] 7,899 | 387 | 0.510 | 381 | 8–12 | 76,500 | 3.6 |
| 10 | 3,000 | [2] 30,993 | 1,347 | 0.621 | 368 | 8–12 | 93,000 | 4.0 |

[1] Productivity after treatment/productivity before treatment.
[2] Not feasible, due to prohibitive wellhead pressures.
Treatment Size, 15,000 gal.; Tubing Size, 2½ inch; Depth, 8,100′; Frac. Gradient, 0.7; $C_{-vw}$, 0.001; Formation Thickness, 40′; Young's Modulus, $3 \times 10^6$; Poisson's Ratio, 0.3; Permeability, 20 md.; Reservoir Fluid Viscosity, 4 cp.; Reservoir Fluid Compressibility, 0.00004; Reservoir Pressure, 2,200 .s.i.; Reservoir Temperature, 215° F.

It will be noted from Table I that the fracture capacity and productivity ratio increased rapidly as the viscosity of the fracturing fluid increased. With viscosities below 100 centipoises, little or no improvement can be obtained in the particular formation described. With the 100 centipoise fluids, a very small improvement is obtained at an injection rate of five barrels per minute and a threefold improvement is indicated if the rate is increased to 10 barrels per minute. The 3,001 horsepower required to achieve such a rate in the absence of a low viscosity liquid would necessitate the use of wellhead pressures greater than those which can be handled with presently available equipment. The use of a 500 centipoise viscosity fluid at a rate of five barrels per minute requires over 1500 horsepower and again will give about a threefold improvement in productivity. Without the low viscosity liquid, fluids with viscosities over about 500 centipoises cannot be used, even at low injection rates, because of prohibitive wellhead pressures. The table shows that the use of a low viscosity liquid in conjunction with the fracturing fluid makes the application of highly viscous fluids feasible and results in higher capacities and productivity ratios than can otherwise be obtained. These are due in part to the increased fracture width obtained with the high viscosity fluids and are partially attributable to the use of propping agent particles substantially larger than the maximum sizes useful with fluids having viscosities less than 100 centipoises.

The results made possible by the invention are further illustrated by the actual production improvements obtained in a series of field tests in which wells in several different fields were fractured with highly viscous water-in-oil emulsion-type fracturing fluids in the presence of low viscosity aqueous surfactant solutions. Rounded quartz sand, garnet crystals, and rounded walnut hulls were employed as the propping agents. These wells were completed in reservoirs having permeabilities ranging from one milidarcy up to 400 millidarcies. The well depths varied from about 1500 feet to over 8,000 feet. The formation characteristics, treatment volumes, injection rates and production rates before and after fracturing these wells are shown in the following table:

tially the flow properties and pressure drop characteristics of the heavy oil.

Figure 5:
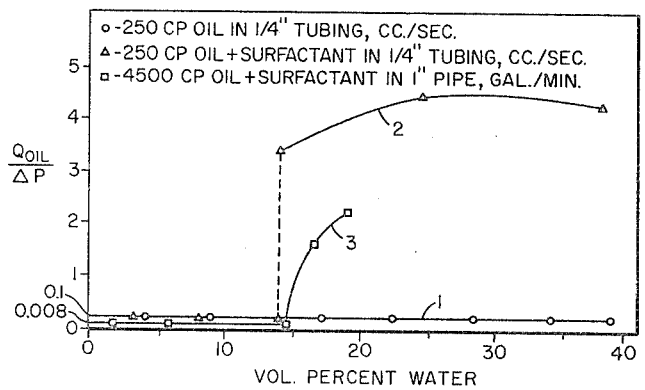
FIGURE 5 is a graph illustrating the flow behavior of heavy oils useful for purposes of the invention in the presence of free water.

The data from which curve 2 in FIGURE 5 was plotted

TABLE II.—TABULATION OF FIELD TEST RESULTS

| Well | Depth | Form. Thick., ft. | Perm., md. | Filter Loss Add. | Frac. Fld. Vis., cp.ᵃ | Sand Size, mesh | Vol. Fld. Inj., gal. | Wt. Sand Inj., lb. | Avg. Inj. Rate, bbl./min. | Sand Conc., lb./gal. | | Production BFPD | |
|---|---|---|---|---|---|---|---|---|---|---|---|---|---|
| | | | | | | | | | | Avg. | Max. | Before | After ᵇ |
| A | 8,095 | 40 | 10 | None | 750 | 10-20 | 2,000 | 1,900 | 10 | 1 | 1 | (ᶠ) | (ᶠ) |
| Bʰ | 5,119 | 74 | 12 | do | 750 | 8-12 | 30,000 | 85,000 | 6 | 3 | 6 | 39 | ᵍ 238 |
| C | 5,084 | 74 | 12 | do | 750 | 8-12 | 30,000 | 100,000 | 8 | 3 | 9 | No Test | ᵍ 147 |
| D | 4,300 | 22 | 4 | do | 750 | 8-12 | 10,000 | 34,000 | 6 | 3 | 12 | 10 | ᵍ 64 |
| E | 5,073 | 80 | 12 | do | 750 | 8-12 | 16,500 | 69,000 | 8 | 4 | 5 | 20 | ᵍ 168 |
| F | 5,005 | 76 | 12 | do | 750 | 8-12 | 30,000 | 115,000 | 8 | 4 | 6 | 20 | ᵍ 220 |
| G | 5,162 | 83 | 12 | do | 750 | 8-12 | 20,000 | 38,000 | 5 | 2 | 5 | 5 | ᵍ 146 |
| H | 5,220 | 8 | 46 | do | 420 | 8-12 | 8,800 | 16,500 | 6 | 2 | 5 | ᵉ 1,260 | No Test |
| I | 2,670 | 36 | 300 | do | 2,000 | 10 | 20,000 | 140,000 | 15 | 2 | 5 | 60 | ᵍ 150 |
| J | 1,493 | 63 | 40 | do | 5,000 | 8-16 | 6,500 | 10,000 | 11 | 2 | 4 | 61 | ᵍ 194 |
| K | 1,503 | 41 | 40 | do | 5,000 | 8-16 | 6,500 | 6,000 | 11 | 1 | 4 | 53 | ᵍ 214 |
| L | 7,350 | 50 | 25 | Yes ʲ | 250 | 20-40 | 42,000 | 1,000 | 9 | 0.5 | | 24 | ᵍ 120 |
| | | | | | | ᵈ 12-20 | | 4,300 | | 0.3 | | | |
| M | 4,700 | 25 | 5 | None | 500 | 8-12 | 26,000 | 76,000 | 7 | 3 | 5 | 0 | ᶜ 500 |
| N | 5,000 | 22 | 10 | do | 750 | 8-12 | 20,000 | 40,000 | 5 | 2 | 5 | 2 | ᵍ 60 |
| O | 4,900 | 20 | 10 | do | 750 | 8-12 | 27,000 | 54,000 | 5 | 2 | 5 | 15 | ᵍ 90 |
| P | 5,160 | 65 | 10 | do | 750 | 8-12 | 30,000 | 115,000 | 8 | 4 | 7 | 2 | ᵍ 69 |
| Qʰ | 1,500 | 28 | 40 | do | 5,000 | 8-12 | 7,500 | 15,000 | 10 | 2 | 3 | 5 | 59 |
| R ᵉ,ʰ | 1,500 | 38 | 40 | do | 5,000 | 8-12 | 11,300 | 35,000 | 10 | 3 | 5 | 40 | 80 |
| S ʰ | 3,600 | 2 | 10 | do | 2,600 | 8-12 | 23,300 | 50,000 | 10 | 2 | 4 | 2 | No Test |
| T | 2,200 | 25 | 20 | do | 750 | 8-12 | 25,000 | 50,000 | 10 | 2 | 3 | 7 | 40 |
| U | 6,640 | 46 | 5 | do | 750 | 8-12 | 17,100 | 20,800 | 10 | 1 | 5 | ᵉ 1,200 | No Test |
| V | 1,500 | | 30 | do | 5,000 | 8-12 | 6,000 | 10,500 | 10 | 2 | 3 | 19 | 47 |
| W | 1,500 | | 40 | do | 5,000 | 8-12 | 5,700 | 10,000 | 10 | 3 | 4 | 23 | ᵍ 221 |
| X ʰ | 1,500 | | 40 | do | 5,000 | 8-12 | 7,500 | 15,000 | 10 | 2 | 4 | 4 | 52 |
| Y | 5,100 | 70 | 12 | do | 750 | 8-12 | 30,000 | 115,000 | 8 | 4 | 7 | 3 | ᵍ 61 |
| Z | 4,950 | 25 | 1 | do | 750 | 8-12 | 14,000 | 35,000 | 2 | 2.5 | 4 | 0 | ᵍ 66 |
| AA | 5,088 | 65 | 12 | do | 750 | 8-12 | 30,000 | 81,000 | 6 | 3 | 5 | No Test | ᵍ 129 |
| BB | 5,950 | 10 | 10 | do | 750 | 8-12 | 14,000 | 58,000 | 7 | 4 | 7 | 8 | 21 |
| CC | 4,370 | 20 | 4 | do | 750 | 8-12 | 15,000 | 50,000 | 5 | 3 | | 3 | ᵍ 73 |
| DD | 4,405 | 20 | 4 | do | 750 | 8-12 | 15,000 | 50,000 | 5 | 3 | 5 | 8 | ᵍ 88 |
| EE | 4,600 | 20 | 3 | do | 2,200 | 8-12 | 21,000 | 82,500 | 10 | 4 | 6 | 5 | 16 |
| FF | 4,600 | 20 | 400 | Yes | 1,000 | 8-12 | 17,000 | 22,000 | 10 | 2 | 4 | 100 | ᵍ 400 |
| GG ᵉ,ʰ | 1,500 | 30 | 40 | None | 5,000 | | 3,000 | | 10 | | | | |
| Gelled Water | | | | | | 8-12 | 14,000 | 33,700 | 14 | 2.4 | 4 | 40 | 160 |

ᵃ At formation temperature.
ᵇ First test following recovery of frac. fluid.
ᶜ MCF/day.
ᵈ Walnut hulls.
ᵉ Injection well.
ᶠ Abandoned well used for experimental purposes.
ᵍ Well production is pump limited.
ʰ Well had been fractured by conventional methods earlier.
ⁱ Garnet crystals.
ʲ Commercial filter loss agent sold for use in fracturing fluids, 40 lbs . 1,000 gal.

It can be seen from Table II that the average increase in production was over fivefold and that in many cases the fractured walls were pump limited. If larger pumps were installed in these wells, the production rates after fracturing would be higher than the values shown. Many of the fractures were evidently quite wide and had conductivities considerably higher than those obtained in the past. Since certain of the formations fractured had permeabilities too high to permit fracturing by conventional methods and others had been subjected to conventional fracturing treatments earlier with limited or no success, it should be apparent that the method of the invention represents an improvement over the prior art.

In lieu of preparing a water-in-oil emulsion or suspension for use as the fracturing fluid and using an annular injector or similar fitting for the separate introduction of the fracturing fluid and an aqueous surfactant solution into the tubing string as described earlier, an oil-external emulsion or suspension and free water can be injected into the well without the annular injector. Tests have shown that excess water does not readily mix with the highly viscous emulsion or suspension and instead tends to persist as free water. This is illustrated by FIGURE 5 in the drawing. The plot shown in FIGURE 5 is a graph of oil pumped per unit pressure drop versus the water content of the system. The data from which curve 1 in the graph was plotted were obtained by pumping a 250 centipoise oil, in combination with the indicated quantity of water but without a surface active agent, through ten feet of one-fourth inch diameter tubing. As indicated by the curve, the pressure drop in the tubing was relatively high and essentially no change in the quantity of oil pumped per unit of pressure drop occurred as the water content of the system was increased from about 4% by volume up to about 40% by volume. This indicates that in the absence of the surface active agent the oil and water formed an oil-external system with essentially the flow properties and pressure drop characteristics of the heavy oil.

The data from which curve 2 in FIGURE 5 was plotted were obtained by pumping a separate quantity of the same oil through the same tubing in the presence of the indicated quantity of water and 0.05% by weight of a surface active agent containing as the active ingredient about 60 volume percent of sodium dioctyl sulfosuccinate, about 30 volume percent of sodium dihexyl sulfosuccinate and about 10 volume percent of isooctylphenyl polyoxyethanol. This surfactant has a distribution coefficient of about one. It can be seen from curve 2 that an oil-external system similar to that obtained earlier was apparently formed and that the presence of the surface active agent had no significant effect on the pressure drop until a water content of about 14 volume percent was reached. At this point, the oil-external emulsion or suspension was apparently incapable of holding additional water and hence free water formed a film surrounding the oil-external fluid. The friction due to this film of water was much lower than that due to the emulsion itself and hence the quantity of oil pumped per unit pressure drop increased about 35 fold. Further reductions in friction were obtained by increasing the water content of the emulsified system.

Results similar to those referred to above were obtained with a 4500 centipoise oil emulsified with various quantities of water and 0.05 volume percent of the surface active agent. As indicated by curve 3 in FIGURE 5, the friction losses dropped markedly when the water content of the system reached about 15% by volume. These latter tests were carried out in one-inch pipe and thus show that the phenomena observed are not dependent on the small diameter tubing employed in the initial tests. It will be recognized that the quantity of water necessary to obtain the reduction in hydraulic friction illustrated in FIGURE 5 will depend in part upon the properties of the oil, water and surface active agent employed and in part upon the diameter of the pipe through which the fluids are pumped. For field operations, the use of from about 30 to 45% water is generally satisfactory but in some cases higher water concentrations may be necessary.

In lieu of employing a highly viscous oil or a viscous water-in-oil emulsion as the fracturing fluid and introducing free water into the system to reduce hydraulic friction, the invention may be carried out with a highly viscous water-based fluid and a low viscosity liquid which is substantially immiscible with water. The water-based fluid employed may be a gelled fluid containing a polymeric thickening agent or a viscous oil-in-water emulsion. Water-external emulsions prepared by dispersing a relatively large quantity of heavy oil with a viscosity in excess of about 250 centipoises at atmospheric temperature in a lesser quantity of water containing a suitable emulsifying agent are preferred because of their stability and low filter loss values but highly viscous water-external emulsions prepared with lighter hydrocarbons can also be used. The low viscosity liquid used in conjunction with the highly viscous gelled fluid or oil-in-water emulsion may be a naphtha, kerosene or similar liquid which has a viscosity below about 10 centipoises and is substantially immiscible with the water-based fluid. Because of the flammability of many low viscosity water-immiscible liquids, however, the use of highly viscous oil-based fluids with water to reduce friction losses is preferred.

The method of the invention may under certain conditions also be carried out with a highly viscous fracturing fluid and a low viscosity liquid which are not substantially immiscible with one another. Considerable energy must be provided to promote the complete mixing of liquids which differ greatly with respect to viscosity and in the absence of sufficient energy many such liquids can flow in contact with one another under the conditions contemplated by the invention without extensive mixing taking place. In shallow wells where the length of pipe to be traversed is relatively short and an efficient annular injector is used, it may therefore sometimes be desirable to lubricate a highly viscous residual petroleum fraction or similar fluid of very high viscosity into the well by means of a very light hydrocarbon liquid or similar fluid which is miscible with heavier material if the two are agitated sufficiently. Although some dilution of the heavy material will occur, this can be controlled by using a relatively small amount of the lubricant fluid. This method avoids the introduction of water into the formation and may therefore be advantageous under certain circumstances.

It is not always essential that the propping agent be injected with the highly viscous fracturing fluid. Instead, the highly viscous fluid may be employed to open the fracture and a fluid of lower viscosity which contains the propping agent can then be injected. In a typical operation of this type, a water injection well completed at a depth of about 1500 feet in a 40 millidarcy formation 30 feet thick was first fractured by injecting 3,000 gallons of an oil-external emulsion having a viscosity of about 5,000 centipoises at formation temperature at 10 barrels per minute. Water introduced through an annular injector similar to that shown in FIGURE 4 was used to lubricate the highly viscous fluid through the tubing. The viscous fracturing fluid was immediately followed with 14,000 gallons of gelled salt water containing 33,700 pounds of 8–12 mesh sand as a propping agent. The gelled water contained about 30 pounds of guar gum per 1000 gallons and was injected at the rate of 14 barrels per minute. No difficulties were encountered in injecting either fluid. The low viscosity gelled fluid containing the propping agent particles apparently fingered into the highly viscous fluid injected initially and displaced it from the fracture, thus permitting introduction of the propping agent particles. Analysis of the pressures during the operation and the subsequent recovery of some sand from the wellbore indicated that the fracture probably narrowed during injection of the gelled fluid but this did not prevent completion of the job. A fourfold improvement in injectivity was obtained. Several previous attempts to place 8–12 mesh sand in a fracture in this formation with a gelled fluid similar to that employed here but without the highly viscous fluid had been unsuccessful.

The use of a fluid of relatively low viscosity to carry the propping agent into place following the initial injection of a highly viscous fracturing fluid and a less viscous liquid as described above is particularly advantageous for the fracturing of water injection wells and gas wells where it is desired to limit the quantity of highly viscous liquid injected and thus accelerate the resumption of normal operations. In lieu of this procedure, a low viscosity fluid miscible with the highly viscous fracturing fluid can be injected in front of the highly viscous fluid so that the viscosity will be reduced by dilution when injection or production is resumed. Diluents can also be injected after completion of the fracturing operation in some cases.

Another modification of the invention involves injection of the highly viscous fluid into the well at a rate insufficient to generate a fracture until essentially all of the lower viscosity fluids present in the wellbore have been displaced into the formation and the pressure behavior indicates that the highly viscous fracturing fluid is in contact with the formation. At this point, the injection rate can be rapidly increased to build up the pressure and generate the fracture. Field tests have shown that this procedure can be employed in shallow wells to generate vertical fractures under conditions such that horizontal fractures might otherwise tend to be formed.

Still other variations of the techniques described may be practiced without departing from the spirit or scope of the invention. It is often advantageous where a loose emulsion or suspension of water in a highly viscous oil is used as the fracturing fluid, for example, to avoid the necessity for mixing the constituents in the field by preparing the emulsion or suspension in a refinery and transporting it to the well site. The introduction of the low viscosity liquid at two or more points in the well may be beneficial. It may be desirable in some cases to inject the highly viscous fracturing fluid through an annular space and provide a film of low viscosity lubricating liquid on both of the confining walls. In lieu of using individual injection pumps working at full fracturing pressures as shown in the drawing, pumps connected in series with suitable hydraulic accumulators between them may be used to reduce the total pressure across any one pump and thus reduce equipment failures. These and other variations will suggest themselves to those skilled in the art.

It will be apparent from the foregoing that the method of the invention has numerous advantages over methods employed heretofore. It makes possible the use of highly viscous fracturing fluids without excessive friction losses, permits the generation of very wide fractures into which large propping agent particles can be injected without difficulty, produces fractures which have surprisingly high conductivities, and makes possible the application of fracturing to formations where conventional methods are seldom successful.

What is claimed is:

1. A method for treating a subsurface formation surrounding a well which comprises lubricating a fracturing fluid down the well on a film of a substantially less viscous fluid at a rate sufficient to open a fracture in said formation.

2. A method as defined by claim 1 wherein at least a portion of said less fracturing fluid is introduced into said well as an annular stream surrounding said viscous fluid.

3. A method as defined by claim 1 wherein said fracturing fluid contains a propping agent.

4. A method as defined by claim 1 wherein said fracturing fluid comprises a hydrocarbon oil with a viscosity of at least 100 centipoises at atmospheric temperature, and said less viscous fluid comprises water.

5. In a method for fracturing a subsurface formation penetrated by a well, the improvement which comprises concurrently injecting a fracturing fluid and a substantially less viscous fluid into said well while retarding the mixing of said fluids and promoting the formation of an annular film of said substantially less viscous fluid about a central stream of said fracturing fluid.

6. A method as defined by claim 5 wherein at least a portion of said less viscous fluid is introduced into said well as an annular stream surrounding the stream of said fracturing fluid.

7. A method for propping a fracture in a subsurface formation penetrated by a well which comprises passing down the well a propping agent suspended in a viscous fluid, concurrently passing a substantially less viscous fluid down at least a portion of the well as an annular stream substantially surounding said viscous fluid, and maintaining a flow rate, sufficient to force the fluids and the propping agent into the fracture.

8. A method for propping a fracture in a subterranean formation penetrated by a well which comprises passing down the well and into said fracture a propping agent suspended in a fracturing fluid comprising a hydrocarbon oil having a viscosity of at least 100 centipoises at formation temperatures and concurrently passing a less viscous liquid down the well in a lubricating relationship with said fracturing fluid, the quantity of said less viscous liquid being sufficient to reduce the pressure required to pass said fracturing fluid down the well and open said fracture for the entry of said propping agent.

9. A method as defined by claim 8 wherein said fracturing fluid has a viscosity of at least 10,000 centipoises at atmospheric temperature.

10. A method as defined by claim 8 wherein fracturing fluid and less viscous liquid are substantially immiscible with one another and at least one of them contains a surface active agent capable of retarding the formation of stable fracturing fluid-less viscous liquid emulsions.

11. A method as defined by claim 10 wherein said hydrocarbon oil is a residual petroleum fraction and said less viscous liquid is water.

12. A method as defined by claim 8 wherein said less viscous liquid is introduced into the upper portion of said well as an annular stream surrounding said fracturing fluid.

13. In a method for hydraulically fracturing a subsurface formation penetrated by a well, the improvement which comprises pumping a first liquid down a passageway within the well and into the fracture at a rate sufficient to open said fracture and simultaneously pumping a second, less viscous liquid down the well substantially between said first liquid and the wall of said passageway in a quantity sufficient to lubricate the flow of said liquid through said passageway.

14. A method as defined in claim 13 wherein said first liquid comprises a water-in-oil emulsion, said second liquid comprises water, and the oil in said emulsion comprises a mixture of hydrocarbons.

15. A method as defined by claim 13 wherein said first liquid is an oil-in-water emulsion containing a hydrocarbon oil and said second liquid is substantially immiscible with water.

16. A method as defined by claim 13 wherein said first liquid is gelled fluid and said second liquid is substantially immiscible with said gelled fluid.

17. A method for opening a fracture in a subterranean formation penetrated by a well containing a string of pipe which comprises lubricating a fracturing fluid down said string of pipe with a less viscous fluid, said fracturing fluid having a viscosity of at least 100 centipoises at atmospheric temperature and being passed down the string of pipe at a rate sufficient to open a fracture in said formation.

18. A method for opening a fracture in a subterranean formation penetrated by a wellbore containing a string of tubular goods which comprises establishing a column of liquid having a viscosity discontinuity between the center of said column and the periphery of said column within said string of tubular goods, the viscosity of the liquid in said column near the center thereof being at least 100 centipoises and the viscosity of the liquid in said column near the periphery thereof being less than about 10 centipoises, and applying sufficient pressure to said column of liquid to open a fracture in a subterranean formation exposed to said liquid near the lower end of said string of tubular goods.

19. A method as defined by claim 18 wherein said column of liquid contains a major portion of a highly viscous liquid and a minor portion of a free liquid of lower viscosity, the viscosity of said highly viscous liquid at atmospheric temperature being at least 100 times the viscosity of said liquid of lower viscosity at atmospheric temperature.

20. In a method for the hydraulic fracturing of a subsurface formation penetrated by a wellbore wherein a fluid composition is pumped through a conduit within said wellbore leading from the surface of the earth to the level of said formation at a pressure sufficient to fracture said formation, the improvement which comprises injecting as said composition a mixture comprising a major proportion of a highly viscous fluid and a minor proportion of a less viscous fluid which is capable of preferentially wetting the inner surfaces of said conduit in the presence of said highly viscous fluid, said fluids being capable of resisting stable admixture with one another.

21. A method for the hydraulic fracturing of a subterranean formation surrounding a well containing a string of pipe which comprises passing a high viscosity liquid containing a suspended propping agent and sufficient low viscosity liquid to maintain a film of said low viscosity liquid adjacent the inner wall of the pipe through said string of pipe under sufficient pressure and at a sufficiently high rate to open a fracture in said subterranean formation and carry said suspended propping agent into the fracture.

22. A method as defined by claim 21 wherein at least part of said low viscosity liquid is introduced into said string of pipe as an annular stream.

23. A method as defined in claim 21 wherein said high viscosity liquid and said low viscosity liquid are introduced into said string of pipe as an unstable mixture in which the low viscosity liquid tends to seek the outer wall of the pipe as the mixture moves downwardly through said string of pipe.

24. A method as defined by claim 21 wherein said high viscosity liquid and said low viscosity liquid are substantially immiscible with one another.

25. A method as defined by claim 21 wherein said high viscosity liquid is a hydrocarbon oil having a viscosity in excess of about 500 centipoises and said low viscosity liquid is an aqueous liquid.

26. A method as defined by claim 21 wherein said aqueous liquid contains a demulsifying agent.

27. A method for the hydraulic fracturing of a subterranean formation surrounding a well containing a string of pipe which comprises passing down through said string of pipe an inner stream of liquid having a viscosity in excess of about 500 centipoises and an outer concentric stream of liquid having a viscosity less than about 10 centipoises, said inner stream of liquid containing a suspended propping agent and said liquid being passed through said string of pipe under sufficient pressure and at a sufficiently high rate to open a fracture in said formation and carry said suspended propping agent into said fracture.

28. A method as defined by claim 27 wherein said inner stream of liquid contains a mixture of a hydrocarbon oil and water and said outer stream of liquid is an aqueous solution containing a surface active agent.

29. A method for propping a fracture in a subterranean formation penetrated by a well with a propping agent which comprises passing a fracturing fluid down the well at a rate sufficient to open the fracture within said formation, said fracturing fluid having a viscosity sufficient to open said fracture for the acceptance of said propping agent, and concurrently passing a second, less viscous fluid down the well in a lubricating relationship with said fracturing fluid.

30. A method as defined in claim 29 in which said fracturing fluid and said second, less viscous fluid are substantially immiscible with one another.

31. A method as defined in claim 29 in which said fracturing fluid comprises a mixture of liquid hydrocarbons and said second less viscous fluid comprises water.

32. A method as defined in claim 31 in which said propping agent is suspended in the mixture of liquid hydrocarbons.

33. A method as defined in claim 31 in which said second fluid contains a polymeric friction reducer.

References Cited
UNITED STATES PATENTS

| | | | |
|---|---|---|---|
| 2,024,718 | 12/1935 | Chamberlain | 252—8.55 |
| 2,533,878 | 12/1950 | Clark et al. | 137—78 |
| 2,596,843 | 5/1952 | Farris. | |
| 2,742,426 | 4/1956 | Brainerd | 252—8.55 |
| 3,080,920 | 3/1963 | Fast | 166—42 |
| 3,102,548 | 9/1963 | Smith et al. | 137—13 |
| 3,105,047 | 9/1963 | Miller et al. | 252—8.55 |
| 3,196,947 | 7/1965 | Van Poollen | 166—45 |
| 3,215,154 | 11/1965 | White et al. | 166—42 X |
| 3,254,719 | 6/1966 | Root. | 166—42 |

STEPHEN J. NOVOSAD, *Primary Examiner.*

UNITED STATES PATENT OFFICE
CERTIFICATE OF CORRECTION

Patent No. 3,378,074

April 16, 1968

Othar M. Kiel

It is certified that error appears in the above identified patent and that said Letters Patent are hereby corrected as shown below:

Column 1, line 71, "viscous" should read -- fracturing --.

Signed and sealed this 17th day of March 1970.

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,378,074            Dated      April 16, 1968

Inventor(s)     Othar M. Kiel

It is certified that error appears in the above-identified patent and that said Letters Patent are hereby corrected as shown below:

In column 16, claim 2 should read as follows:

2. A method as defined by claim 1 wherein at least a portion of said less viscous fluid is introduced into said well as an annular stream surrounding said fracturing fluid.

The earlier certificate of correction dated March 17, 1970 is erroneous and should be ignored.

SIGNED AND
SEALED
AUG 25 1970

(SEAL)
Attest:

Edward M. Fletcher, Jr.
Attesting Officer

WILLIAM E. SCHUYLER, JR.
Commissioner of Patents